US010070405B2

(12) United States Patent
Ko et al.

(10) Patent No.: US 10,070,405 B2
(45) Date of Patent: Sep. 4, 2018

(54) TERMINAL APPARATUS AND METHOD FOR TIME SYNCHRONIZATION

(71) Applicant: Samsung Electronics Co., Ltd., Suwon-si, Gyeonggi-do (KR)

(72) Inventors: Jae-hoon Ko, Suwon-si (KR); Woo-jin Park, Yongin-si (KR); Won-joo Park, Yongin-si (KR); Hyun-cheol Park, Seoul (KR); Hun-je Yeon, Seoul (KR); Si-jun Lee, Suwon-si (KR); Jin-wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 14/174,197

(22) Filed: Feb. 6, 2014

(65) Prior Publication Data

US 2014/0226553 A1 Aug. 14, 2014

(30) Foreign Application Priority Data

Feb. 12, 2013 (KR) ........................ 10-2013-0015006

(51) Int. Cl.
*H04W 56/00* (2009.01)
*H04J 3/06* (2006.01)
(52) U.S. Cl.
CPC ....... *H04W 56/0015* (2013.01); *H04J 3/0635* (2013.01); *H04W 56/001* (2013.01); *H04W 56/002* (2013.01)
(58) Field of Classification Search
CPC ................................ H04W 56/0015
See application file for complete search history.

(56) References Cited

U.S. PATENT DOCUMENTS 5,297,144 A * 3/1994 Gilbert ................. H04W 74/06
370/346
6,834,091 B2 * 12/2004 Litwin, Jr. ............. H04B 3/542
340/12.37

(Continued)

FOREIGN PATENT DOCUMENTS

CN 1667997 A 9/2005
CN 101132222 B 2/2011

(Continued)

OTHER PUBLICATIONS

Xi Chen et al: "A Routing Based Time Synchronization Protocol for Multi-Hop Wireless Networks", Communications (ICC). 2010 IEEE International Conference on, IEEE, Piscataway, NJ, USA, May 23, 2010 (May 23, 2010). pages 1-6. XP031702997.

(Continued)

*Primary Examiner* — Edan Orgad
*Assistant Examiner* — Nourali Mansoury
(74) *Attorney, Agent, or Firm* — Jefferson IP Law, LLP

(57) ABSTRACT

A terminal apparatus and a method for time synchronization are provided. The method includes setting a reference time for a time synchronization with another terminal apparatus, transmitting a sync signal comprising the set reference time to the other terminal apparatus, and if a response signal to the sync signal is received from the other terminal apparatus, performing the time synchronization with the other terminal apparatus based on a transmission time of the sync signal and a reception time of the response signal. Therefore, a terminal apparatus further simply and rapidly performs a time synchronization with another terminal apparatus.

16 Claims, 7 Drawing Sheets

(56) References Cited

U.S. PATENT DOCUMENTS

| | | | |
|---|---|---|---|
| 7,369,861 B2* | 5/2008 | Vare | H04W 36/32 |
| | | | 455/414.1 |
| 7,483,448 B2 | 1/2009 | Bhandari et al. | |
| 7,924,806 B2 | 4/2011 | Yamaji | |
| 8,312,173 B2 | 11/2012 | Berg et al. | |
| 2002/0054611 A1* | 5/2002 | Seta | H04B 7/2693 |
| | | | 370/503 |
| 2002/0181439 A1* | 12/2002 | Orihashi | H04J 3/0605 |
| | | | 370/350 |
| 2005/0201421 A1* | 9/2005 | Bhandari | H04J 3/0682 |
| | | | 370/519 |
| 2007/0177574 A1 | 8/2007 | Park et al. | |
| 2009/0086764 A1 | 4/2009 | Lee et al. | |
| 2009/0100135 A1 | 4/2009 | Lee et al. | |
| 2010/0260167 A1 | 10/2010 | Kim et al. | |
| 2011/0235560 A1* | 9/2011 | Kurita | G08B 17/00 |
| | | | 370/311 |
| 2011/0268018 A1* | 11/2011 | Wang | H04W 56/002 |
| | | | 370/328 |
| 2014/0064264 A1* | 3/2014 | Morita | H04W 56/00 |
| | | | 370/350 |

FOREIGN PATENT DOCUMENTS

| | | |
|---|---|---|
| EP | 2 068 523 A1 | 6/2009 |
| JP | 2006237865 A | 9/2006 |
| KR | 20060134265 A | 12/2006 |
| KR | 20070081149 A | 8/2007 |
| KR | 20090071923 A | 7/2009 |

OTHER PUBLICATIONS

Simeone 0 et al: "Distributed synchronization in wireless networks", IEEE Signal Processing Magazine, IEEE Service Center. Piscataway, NJ, US. vol. 25, No. 5, Sep. 1, 2008 (Sep. 1, 2008). pp. 81-97. XP011233605.

Yik-Chung Wu et al: "Clock Synchronization of Wireless Sensor Networks", IEEE Signal Processing Magazine, IEEE Service Center, Piscataway, NJ, US. vol. 28, No. 1, Jan. 1, 2011 (Jan. 1, 2011). pp. 124-138. XP011340309.

* cited by examiner

TERMINAL APPARATUS AND METHOD FOR TIME SYNCHRONIZATION

CROSS-REFERENCE TO RELATED APPLICATION(S)

This application claims the benefit under 35 U.S.C. § 119(a) of a Korean patent application filed on Feb. 12, 2013 in the Korean Intellectual Property Office and assigned Serial No. 10-2013-0015006, the entire disclosure of which is hereby incorporated by reference.

TECHNICAL FIELD

The present disclosure relates to providing a terminal apparatus and a method for a time synchronization. More particularly, the present disclosure relates to providing a terminal apparatus and a method for performing a time synchronization between terminal apparatuses.

BACKGROUND

A terminal apparatus according to the related art performs a time synchronization with another terminal apparatus through a repeater. In detail, the terminal apparatus selects an arbitrary repeater and transmits a sync signal for performing the time synchronization to the selected repeater in order to perform the time synchronization with the other terminal apparatus. Therefore, the repeater transmits the sync signal received from the terminal apparatus to the other terminal apparatus positioned within a wireless communication radius according to a broadcasting method. The other terminal apparatus transmits a response signal, including a reception time when the sync signal is received from the repeater, to the repeater. When the response signal is received from the other terminal apparatus, the repeater generates a response signal, including a reception time when receiving the sync signal from the terminal apparatus and a reception time when receiving the response signal from the other terminal apparatus, and transmits the response signal to the terminal apparatus. Therefore, the terminal apparatus performs the time synchronization with the other terminal apparatus based on the response signal received from the repeater. In other words, the terminal apparatus calculates a time difference with the other terminal apparatus based on the reception time when receiving the sync signal and the reception time when receiving the response signal from the other terminal apparatus and performs the time synchronization with the other terminal apparatus based on the calculated time difference, wherein the response signal includes the reception times.

However, when such an existing time synchronization method is performed, the terminal apparatus does not perform the time synchronization with the other terminal apparatus that is selected as the repeater. In addition, the terminal apparatus performs the time synchronization with the other terminal apparatus through the repeater. As a result, the time synchronization process requires a significant number of messages transmitted and received between apparatuses In addition, the messages transmitted and received between the apparatuses during the time synchronization process according to the related art are relatively complicated. As a result, the time synchronization method is not appropriated for a wireless environment in which a packet loss frequently occurs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal apparatus and method for performing a time synchronization between terminal apparatuses.

In accordance with an aspect of the present disclosure, a method of performing a time synchronization is provided. The method includes setting a time corresponding to a time, at which a sync signal for the time synchronization is to be transmitted to another terminal apparatus, to a reference time, transmitting the sync signal including the set reference time to at least two other terminal apparatuses, and if response signals are received from the at least two terminal apparatuses, performing a time synchronization with all of the at least two other terminal apparatuses based on a reception time of first received one of the received response signals and the reference time.

In accordance with another aspect of the present disclosure, the performing of the time synchronization may include comparing reception times of response signals received from a first other terminal apparatus and a second other terminal apparatus to acquire the first received response signal, calculating a time difference between the reference time and a reception time of the acquired response signal, and performing a time synchronization with the first other terminal apparatus and the second other terminal apparatus based on the calculated time difference.

In accordance with another aspect of the present disclosure, the time difference may be calculated using an equation corresponding to $(S-V)/2$, wherein $S$ denotes the reference time comprised in the sync signal, and $V$ denotes a reception time of the response signal.

In accordance with another aspect of the present disclosure, the sync signal may be transmitted by a preset number of times. The time synchronization may be performed with the first other terminal apparatus and the second other terminal apparatus based on a time difference having a lowest absolute value among time differences that are calculated based on reception times of response signals received to respectively correspond to the sync signal transmitted the preset number of times.

In accordance with another aspect of the present disclosure, the time synchronization may be performed with the first other terminal apparatus and the second other terminal apparatus according to whether an absolute value of the calculated time difference is lower than or equal to a preset threshold time.

In accordance with another aspect of the present disclosure, the method may further include determining a common time with the first other terminal apparatus and the second other terminal apparatus from a sum of a current time of the terminal apparatus and the calculated time difference.

In accordance with another aspect of the present disclosure, the sync signal may be transmitted by using a broadcasting method. A reception time of a response signal of another terminal apparatus that has first transmitted the response signal to the sync signal among first and second other terminal apparatuses that have received the sync signal, may be acquired.

In accordance with another aspect of the present disclosure, a method of performing a time synchronization with another terminal apparatus in a terminal apparatus is provided. The method includes receiving a sync signal including a reference time from the other terminal apparatus, transmitting a response signal to the received sync signal to the other terminal apparatus, and performing a time synchronization with the other terminal apparatus based on a time difference that is calculated based on the reference time included in the sync signal and a reception time of the sync signal.

In accordance with another aspect of the present disclosure, if the sync signal is continuously received from the other terminal apparatus for a preset threshold time, then the time synchronization may be performed with the other terminal apparatus based on a time difference having a highest absolute value among time differences that are calculated to respectively correspond to the sync signal.

In accordance with another aspect of the present disclosure, the method may further include: determining a common time with the other terminal apparatus from a sum of a current time of the terminal apparatus and the calculated time difference.

In accordance with another aspect of the present disclosure, a terminal apparatus is included. The terminal apparatus includes a communicator configured to communicate with another terminal apparatus, a time setter configured to set a time corresponding to a time, at which a sync signal for a time synchronization is to be transmitted to the other terminal apparatus, to a reference time, and a controller configured to transmit the sync signal including the set reference time to at least two another terminal apparatuses and, if response signals to the sync signal are received from the at least two another terminal apparatuses, to perform a time synchronization with the at least two other terminal apparatuses based on a reception time of a first received one of the received response signals and the reference time.

In accordance with another aspect of the present disclosure, the controller may compare reception times of response signals received from a first other terminal apparatus and a second other terminal apparatus to calculate a time difference between the reception time of the first received response signal and the reference time, and determines whether to perform the time synchronization with the first other terminal apparatus and the second other terminal apparatus based on the calculated time difference.

In accordance with another aspect of the present disclosure, the controller may calculate the time difference using an equation corresponding to $(S-V)/2$, wherein S denotes the reference time comprised in the sync signal, and V denotes the reception time of the response signal.

In accordance with another aspect of the present disclosure, the communicator may transmit the sync signal to the other terminal apparatus a preset number of times according to a control command of the controller, and may receive response signals to the sync signal transmitted the preset number of times. The controller may perform the time synchronization with the first other terminal apparatus and the second other terminal apparatus based on a time difference having a lowest absolute value among time differences that are calculated based on reception times of response signals received to respectively correspond to the sync signal transmitted the preset number of times.

In accordance with another aspect of the present disclosure, the communicator may transmit the sync signal to the other terminal apparatus according to a control command of the controller and receive a response signal to the sync signal. If an absolute value of the calculated time difference is lower than or equal to a preset threshold value, the controller may perform the time synchronization with the first other terminal apparatus and the second terminal apparatus, and, if the absolute value of the calculated time difference exceeds the preset threshold value, the controller controls the communicator to re-transmit the sync signal to the first other terminal apparatus and the second other terminal apparatus.

In accordance with another aspect of the present disclosure, the controller may determine a common time with the first other terminal apparatus and the second other terminal apparatus from a sum of the reference time and the calculated time difference.

In accordance with another aspect of the present disclosure, the communicator may transmit the sync signal by using a broadcasting method. The controller may perform the time synchronization with another terminal apparatus that has first transmitted a response signal to the sync signal among first terminal apparatus and the second terminal apparatus that have received the sync signal.

In accordance with another aspect of the present disclosure, a terminal apparatus configured to perform a time synchronization with another terminal apparatus that has requested the time synchronization is provided. The terminal apparatus includes a communicator configured to communicate with the other terminal apparatus a calculator configured to calculate a time difference from a reference time included in the sync signal and a reception time of the sync signal if the sync signal comprising the reference time is received from the other terminal apparatus and a controller configured to transmit a response signal to the received sync signal to the other terminal apparatus and to perform the time synchronization with the other terminal apparatus based on the calculated time difference.

In accordance with another aspect of the present disclosure, if the sync signal is continuously received from the other terminal apparatus for a preset threshold time, the controller may perform the time synchronization with the other terminal apparatus based on a time difference having a highest absolute value among time differences that are calculated to respectively correspond to the received sync signal.

In accordance with another aspect of the present disclosure, the controller may determine a common time with the other terminal apparatus from a sum of a reception time of the sync signal and the calculated time difference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, a terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Figure 1:
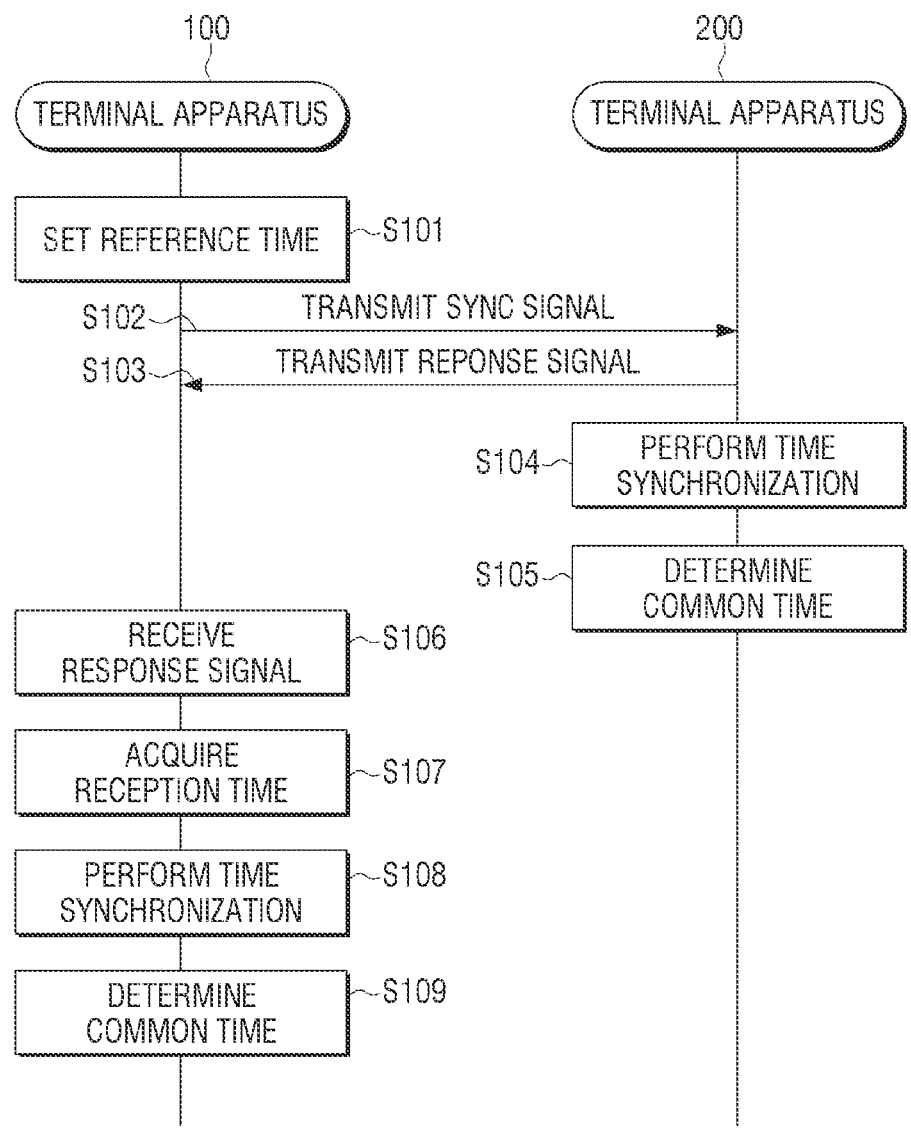
FIG. 1 is a flowchart illustrating a method of performing a time synchronization between terminal apparatuses according to an embodiment of the present disclosure.

FIG. 1 is a flowchart illustrating a method of performing a time synchronization between terminal apparatuses according to an embodiment of the present disclosure.

Referring to FIG. 1, at operation S101, a terminal apparatus 100 sets a reference time necessary for a time synchronization with a terminal apparatus 200 to perform the time synchronization with the terminal apparatus 200. The reference time may be a time corresponding to a time when a sync signal is transmitted to the terminal apparatus 200 to perform the time synchronization with the terminal apparatus 200. However, various embodiments of the present disclosure are not limited thereto, and the reference may be an arbitrary time that is arbitrarily set by a user.

If the reference time is set at operation S101, then at operation S102, the terminal apparatus 100 transmits the sync signal including the reference time to the terminal apparatus. The terminal apparatus 100 may transmit the sync signal to other terminal apparatuses including the terminal apparatus 200 according to a broadcasting method, wherein the other terminal apparatuses and the terminal apparatus 200 are positioned within a preset range.

If the terminal apparatus 200 receives the sync signal transmitted from the terminal apparatus 100 at operation S102, then at operation S103, the terminal apparatus 200 transmits a response signal with respect to the sync signal to the terminal apparatus 100 based on address information included in the received sync signal. The other terminal apparatuses that have received the sync signal from the terminal apparatus 100 may transmit response signals with respect to the sync signal to the terminal apparatus 100 based on the address information included in the received sync signal.

At operation S104, the terminal apparatus 200 performs time synchronization. For example, at operation S104, the terminal apparatus 200 calculates a time difference between the reference time of the sync signal received from the terminal apparatus 100 and a reception time when receiving the sync signal and performs the time synchronization with the terminal apparatus 100 based on the calculated time difference. In other words, the terminal apparatus 200 calculates the time difference between the reference time of the sync signal received from the terminal apparatus 100 and the reception time when receiving the sync signal. The other terminal apparatuses that have received the sync signal from the terminal apparatus 100 may also perform the time synchronization with the terminal apparatus 200 according to the same method. A time difference between the terminal apparatus 200 and the terminal apparatus 100 may be calculated through Equation (1) below:

$$TD_1 = T - R1 \qquad \text{Equation (1)}$$

In Equation (1), T denotes the reference time, and R1 denotes the reception time. Therefore, if the terminal apparatus 200 receives the sync signal from the terminal apparatus 100, then the terminal apparatus 200 may calculate a time difference $TD_1$ from a difference between the reference time T of the sync signal and the reception time R1 of the sync signal. Therefore, the terminal apparatus 200 may perform the time synchronization with the terminal apparatus 100 based on the time difference calculated from Equation (1).

At operation S105, the terminal apparatus 200 determines a common time. For example, if the terminal apparatus 200 performs the time synchronization with the terminal apparatus 100 based on the time difference calculated through Equation (1) as described above, then at operation S105, the terminal apparatus 200 determines as common time from a sum of a current time of the terminal apparatus 200 and the time difference calculated for the time synchronization.

At operation S106, the terminal apparatus 100 receives a response signal with respect to the sync signal transmitted from the terminal apparatus 200 at operation S103. The terminal apparatus 100 may receive response signals with respect to the sync signal from all of the other terminal apparatuses including the terminal apparatus 200 according to a unicasting method.

At operation S107, the terminal apparatus 100 acquires a reception time of the response signal of the terminal apparatus 200 that has first transmitted the response signal. According to various embodiments of the present disclosure, if the response signal of the terminal apparatus 200 of the terminal apparatuses having transmitted the response signals to the sync signal has been determined to have been first received, then the terminal apparatus 100 may acquire the reception time when receiving the response signal from the terminal apparatus 200. If the reception time of the response signal is acquired, then the terminal apparatus 100 calculates the time difference based on the reference time of the sync signal transmitted according to the broadcasting method at operation S102 and the reception time of the response signal received from the terminal apparatus 200. However, various embodiments of the present disclosure are not limited thereto, and the reference time may be an arbitrary time that is arbitrarily set by a user as described above. In this case, the terminal apparatus 100 may calculate the time difference between a transmission time when transmitting the sync signal according to the broadcasting method and the reception time of the response signal received from the terminal apparatus 200. According to various embodiments of the present disclosure, an operation of setting a time corresponding to a time when transmitting the sync signal to a reference time and calculating a time difference based on the set reference time and a reception time of a response signal received from the terminal apparatus 200 will be described. If the time difference is calculated, then the terminal apparatus 100 performs the time synchronization with the terminal apparatus 200 and the other terminal apparatuses based on the calculated time difference at operation S108.

In other words, the terminal apparatus may calculate the time difference through Equation (2) below:

$$TD_2 = (S-V)/2 \qquad \text{Equation (2)}$$

In Equation (2), S denotes the reference time set from a time corresponding to a time when transmitting the sync signal, and V denotes a reception time of a response signal received from the terminal apparatus 200. Therefore, the terminal apparatus 100 may calculate a time difference TD2 between the terminal apparatus 100 and the terminal apparatus 200 based on a transmission time when transmitting the sync signal to the other terminal apparatuses including the terminal apparatus 200 according to the broadcasting method and a reception time of the response signal of the terminal apparatus 200 that has first transmitted the response signal. Therefore, the terminal apparatus 100 may perform the time synchronization with the terminal apparatus 200 and the other terminal apparatuses based on the time difference calculated from Equation (2). If the time synchronization is performed as described above, then at operation S109, the terminal apparatus 100 determines a common time with the terminal apparatus 200 and the other terminal apparatuses from a sum of a current time and the time difference calculated from Equation (2).

As described above, according to various embodiments of the present disclosure, the terminal apparatus 100 performs a time synchronization with a plurality of other terminal apparatuses based on a reception time of a response signal of the terminal apparatus 200 of the plurality of other terminal apparatuses that has first transmitted the response signal to a sync signal transmitted to the plurality of other terminal apparatuses. Therefore, the terminal apparatus 100 that has performed the time synchronization with the plurality of terminal apparatuses may perform an event simultaneously with the plurality of other terminal apparatuses based on a preset common time. The event may be an event in which a moving picture file and a music file are simultaneously played. In this case, the terminal apparatuses that have performed time synchronization may play the moving picture file or the music file at a time corresponding to the preset common time.

A method of performing a time synchronization between the terminal apparatus 100 and the other terminal apparatuses including the terminal apparatus 200 has been described in brief. Elements of the terminal apparatus 100 and the terminal apparatus 200 will now be described in detail.

Figure 2:
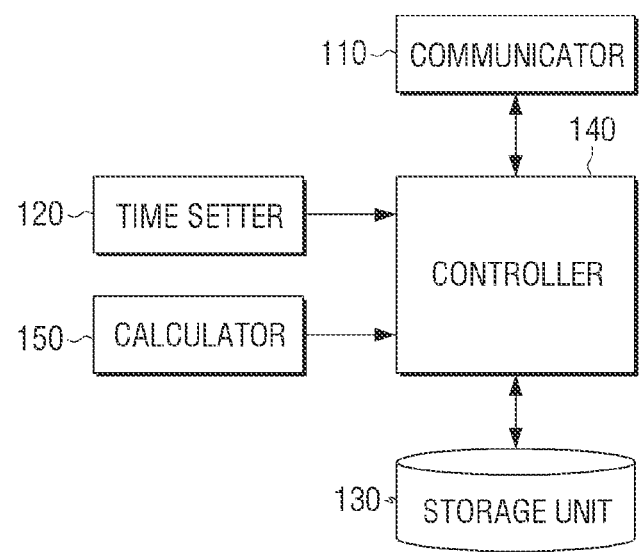
FIG. 2 is a block diagram illustrating a terminal apparatus that performs a time synchronization with another terminal apparatus according to an embodiment of the present disclosure.

FIG. 2 is a block diagram illustrating a terminal apparatus that performs a time synchronization with another terminal apparatus according to an embodiment of the present disclosure.

Referring to FIG. 2, the terminal apparatus 100 transmits a sync signal for a time synchronization to a plurality of other terminal apparatuses. When response signals to the sync signal are respectively received from the plurality of other terminal apparatuses, the terminal apparatus 100 performs the time synchronization with the plurality of other terminal apparatuses based on first received one of the response signals. The terminal apparatus 100 may be one of the plurality of other terminal apparatuses. In this case, the terminal apparatus 100 transmits a response signal to the sync signal, wherein the response signal is received from another terminal apparatus to which the sync signal has been transmitted. The terminal apparatus 100 may transmit a response signal to another terminal apparatus to which the sync signal has been transmitted according to a unicasting method. The terminal apparatus 100 may perform the time synchronization with the other terminal apparatus based on the sync signal received from the other terminal apparatus. According to various embodiments of the present disclosure, only an operation of transmitting a sync signal from the terminal apparatus 100 to a plurality of other terminal apparatuses according to a broadcasting method and performing a time synchronization with the plurality of other terminal apparatuses based on first one of response signals respectively received from the plurality of other terminal apparatuses will be described.

The terminal apparatus 100 that performs the time synchronization with the plurality of other terminal apparatuses as described above includes a communicator 110, a time setter 120, a storage unit 130, and a controller 140. According to various embodiments of the present disclosure, the terminal apparatus 100 may include a calculator 150.

The communicator 110 communicates with the plurality of other terminal apparatuses and may be realized as a communication module such as, for example, a short range wireless communication module (not shown), a wireless communication module (not shown), and/or the like. The communicator 110 realized as the wireless communication module may be connected to an external network to communicate with the plurality of other terminal apparatuses according to a wireless communication protocol. In particular, the communicator 110 may be realized as the wireless communication module to transmit the sync signal to the plurality of other terminal apparatuses according to the broadcasting method.

The time setter 120 sets a reference time for the time synchronization with the plurality of other terminal apparatuses. The reference time may be a time corresponding to a time when transmitting the sync signal for the time synchronization with the plurality of other terminal apparatuses. Therefore, the time setter 120 may set the time corresponding to the time when transmitting the sync signal to the plurality of other terminal apparatuses, to the reference time. If the reference time is set, then the storage unit 130 stores the reference time set by the time setter 120.

The storage unit 130 may be realized as a storage medium, a memory, a Hard Disk Drive (HDD), or the like that stores various types of programs necessary for operating the terminal apparatus 100. For example, the storage unit 130 may include a Read Only Memory (ROM) that stores a program for performing an operation of the controller 140 and a Random Access Memory (RAM) that temporarily stores data acquired according to the performance of the operation of the controller 140. The storage unit 130 may also include an Electrically Erasable and Programmable ROM (EEROM) that stores various types of reference data. Therefore, the storage unit 130 may store the reference time set by the time setter 120.

The controller 140 transmits the sync signal including the reference time set by the time set by the time setter 120 to the plurality of other terminal apparatuses. In addition, if response signals to the sync signal are received from the plurality of other terminal apparatuses, then the controller 140 performs the time synchronization with the plurality of other terminal apparatuses based on a transmission time of the sync signal and a reception time of the first one of the received response signals.

In detail, if the reference time is set by the time setter 120, then the controller 140 controls the communicator 110 to transmit the sync signal including the reference time to perform the time synchronization with the plurality of other terminal apparatuses. The controller 140 may control the communicator 110 to transmit the sync signal according to the broadcasting method, so that the plurality of other terminal apparatuses positioned within a wireless communication radius receive the sync signal. According to such a control command, the communicator 110 transmits the sync signal to the plurality of other terminal apparatuses positioned within the wireless communication radius according to the broadcasting method. Therefore, the plurality of other terminal apparatuses positioned within the wireless communication radius along with the terminal apparatus 100 may receive the sync signal from the terminal apparatus 100 and may transmit response signals to the sync signal to the terminal apparatus 100.

Therefore, the communicator 110 may receive the response signals from the plurality of other terminal apparatuses, respectively, that have received the sync signal. In this case, the controller 140 may perform the time synchronization with the plurality of other terminal apparatuses based on a reception time of the first received one of the response signals respectively received from the plurality of other terminal apparatuses that have received the sync signal.

Figure 3:
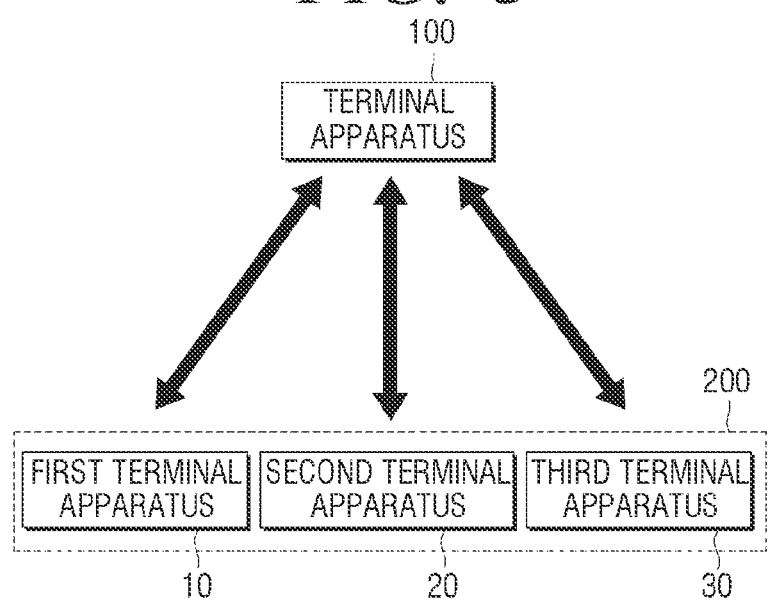
FIG. 3 is a view illustrating a process of receiving a response signal from a plurality of other terminal apparatuses to which a terminal apparatus transmits a sync signal according to a broadcasting method, according to an embodiment of the present disclosure.

FIG. 3 is a view illustrating a process of receiving response signals from a plurality of other terminal apparatuses that have transmitted a sync signal according to a broadcasting method, in a terminal apparatus, according to an embodiment of the present disclosure.

Referring to FIG. 3, the communicator 110 transmits a sync signal including a reference time to a plurality of other terminal apparatuses positioned within a wireless communication radius by using a broadcasting method according to a control command of the controller 140. In detail, the communicator 110 transmits the sync signal to first, second, and third terminal apparatuses 10, 20, and 30 positioned within the wireless communication radius. Therefore, if the first, second, and third terminal apparatuses 10, 20, and 30 receive the sync signal from the terminal apparatus 100, then the first, second, and third terminal apparatuses 10, 20, and 30 respectively transmit response signals to the sync signal to the terminal apparatus 100. Therefore, the terminal apparatus 100 receives the response signals to the sync signal from the first, second, and third terminal apparatuses 10, 20, and 30 through the communicator 110. As described above, reception times when the terminal apparatus 100 receives the response signals from the first, second, and third terminal apparatuses 10, 20, and 30 may be different according to distances between the terminal apparatus 100 and the first, second, and third terminal apparatuses 10, 20, and 30 or a surrounding environment. According to various embodiments of the present disclosure, the terminal apparatus 100 compares the reception times of the response signals received from the first, second, and third terminal apparatuses 10, 20, and 30 to perform time synchronization based on the first received response signal.

For example, if the reception time of the response signal received from the first terminal apparatus 10 is 12:00, then the reception time of the response signal received from the second terminal apparatus 20 is 12:15, and the reception time of the response signal received from the third terminal apparatus 30 is 12:07, the controller 140 may perform the time synchronization with the first, second, and third terminal apparatuses 10, 20, and 30 based on the reception time of the response signal received from the first terminal apparatus 10 among the response signals received from the first, second, and third terminal apparatuses 10, 20, and 30.

As described above, the controller 140 acquires a reference time stored in the storage unit 130 to perform the time synchronization with the first, second, and third terminal apparatuses 10, 20, and 30 based on the reception time of the response signal received from the first terminal apparatus 10. As described above, the reference time may be a time corresponding to a time at which the sync signal is to be transmitted to the first, second, and third terminal apparatuses 10, 20, and 30. If the reference time is acquired, then the controller 140 calculates a time difference based on the acquired reference time and the reception time of the response signal received from the first terminal apparatus 10. In other words, the controller 140 may calculate the time difference based on Equation (2) described above. If the time difference is calculated, then the controller 140 determines whether to perform the time synchronization with the first, second, and third terminal apparatuses 10, 20, and 30, based on the calculated time difference.

According to various embodiments of the present disclosure, the communicator 110 may transmit the sync signal to the first, second, and third terminal apparatuses 10, 20, and 30 by the preset number of times and receive response signals to the sync signal from the first, second, and third terminal apparatuses 10, 20, and 30 according to a control command of the controller 140. In this case, the controller 140 may determine whether to perform the time synchronization with the first, second, and third terminal apparatuses 10, 20, and 30, based on a time difference having a lowest absolute value among time differences calculated based on reception times of the received response signals.

For example, if the sync signal is set to be repeatedly transmitted three times per minute, then the communicator 110 may transmit the sync signal to the first, second, and third terminal apparatuses 10, 20, and 30 three times based on the set time unit. The controller 140 stores reference times included in the sync signal transmitted to the first, second, and third terminal apparatuses 10, 20, and 30 in the storage unit 130 by the preset number of times. The first, second, and third terminal apparatuses 10, 20, and 30 may respectively generate response signals to the sync signal, which is received from the terminal apparatus 100 by the preset number of times, and transmit the response signals to the terminal apparatus 100. If the response signals to the sync signal transmitted by the preset number of times are received, then the controller 140 acquires reception times of the response signals. The controller 140 calculates a time difference based on the reference time included in the sync signal and the reception signals of the response signals received from the first, second, and third terminal apparatuses 10, 20, and 30 with respect to the sync signal. The controller 140 may acquire a time difference having a lowest absolute value among calculated time differences and may perform the time synchronization with the first, second, and third terminal apparatuses 10, 20, and 30 based on the acquired time difference.

For example, the first terminal apparatus 10 may be a terminal apparatus that has first transmitted a response signal in relation to a first sync signal. The second terminal apparatus 20 may be a terminal apparatus that has first transmitted a response signal in relation to a second sync signal. The third terminal apparatus 30 may be a terminal apparatus that has first transmitted a response signal in relation to a third sync signal.

In this case, the controller 140 calculates a time difference based on a reception time of the response signal of the first terminal apparatus 10 that has first transmitted the response signal in relation to the first sync signal and a reference time stored in relation to the first sync signal. The controller 140 calculates a time difference based on a reception time of the response signal of the second terminal apparatus 20 that has first transmitted the response signal in relation to the second sync signal and a reference time stored in relation to the second sync signal. The controller 140 calculates a time difference based on a reception time of the response signal of the third terminal apparatus 30 that has first transmitted the response signal in relation to the third sync signal and a reference time stored in relation to the third sync signal. If the time differences respectively corresponding to the first, second, and third sync signals are calculated, then the controller 140 acquires a time difference having a lowest absolute value among the calculated time differences. For example, if an absolute value of the calculated time difference corresponding to the first sync signal is determined to be the lowest, then the controller 140 may perform the time synchronization with the first, second, and third terminal apparatuses 10, 20, and 30 based on the calculated time difference corresponding to the first sync signal.

However, various embodiments of the present disclosure are not limited thereto, and according to a control command of the controller 140, the communicator 110 may transmit the sync signal to one of the first, second, and third terminal apparatuses 10, 20, and 30 by the preset number of times and perform the time synchronization with the first, second, and third terminal apparatuses 10, 20, and 30 based on a time difference having a lowest absolute value among time differences calculated based on reception times of response signals received to respectively correspond to sync signals.

According to various embodiments, the communicator 110 may transmit an initial sync signal to the first, second, and third terminal apparatuses 10, 20, and 30 and may receive response signals to the initial sync signal from the first, second, and third terminal apparatuses 10, 20, and 30. For example, if the response signal of the first terminal apparatus 10 is determined to have been first received, then the communicator 110 may transit the sync signal to the first terminal apparatus 10 by the preset number of times and receive response signals to the sync signal from the first terminal apparatus 10 according to a control command of the controller 140. If the response signals to the sync signal are received from the first terminal apparatus 10, then the controller 140 calculates a time difference based on reception times of the response signals and acquires a difference time having the lowest one of absolute values of calculated time differences. The controller 140 may perform the time synchronization with the first, second, and third terminal apparatuses 10, 20, and 30 based on the time difference having the lowest absolute value.

According to various embodiments of the present disclosure, if an absolute value of a time difference, which is calculated based on a reception time of first received one of response signals received from the first, second, and third terminal apparatuses 10, 20, and 30, is lower than or equal to a preset threshold time, then the controller 140 performs a time synchronization with the first, second, and third terminal apparatuses 10, 20, and 30 based on the calculated time difference. If the absolute value of the calculated time difference exceeds the preset threshold value, then the controller 140 controls the communicator 110 to re-transmit a sync signal to the first, second, and third terminal apparatuses 10, 20, and 30.

In detail, the controller 140 may compare the reception times of the response signals received from the first, second, and third terminal apparatuses 10, 20, and 30 through the communicator 110 to determine that the first terminal apparatus 10 has first received the response signal. Therefore, the controller 140 calculates a time difference based on a reference time stored in relation to the sync signal and the reception time of the response signal received from the first terminal apparatus 10. If the time difference is calculated, then the controller 140 determines whether an absolute value of the calculated time difference is lower than or equal to a preset threshold value. If the absolute value is determined to be lower than or equal to the preset threshold value, then the controller 140 performs a time synchronization with the first, second, and third terminal apparatuses 10, 20, and 30 based on the calculated time difference. If the absolute value of the calculated time difference exceeds the preset threshold value, then the controller 140 controls the communicator 110 to re-transmit the sync signal to the first, second, and third terminal apparatuses 10, 20, and 30. Therefore, the communicator 110 re-transmits the sync signal including the reference time to the first, second, and third terminal apparatuses 10, 20, and 30, and the controller 140 stores the reference time of the sync signal re-transmitted to the first, second, and third terminal apparatuses 10, 20, and 30 in the storage unit 130. If the reception signals are respectively received from the first, second, and third terminal apparatuses 10, 20, and 30, then the controller 140 calculates a time difference based on a reception time of first received one of the response signal and the reference time stored in relation to the re-transmitted sync signal, and determines whether an absolute value of the calculated time difference exceeds a preset threshold value to determine whether to perform the time synchronization with the first, second, and third terminal apparatuses 10, 20, and 30 as described above. As described above, the controller 140 may determine whether to re-transmit the sync signal to the first, second, and third terminal apparatuses 10, 20, and 30, according to whether the absolute value of the calculated time is lower than or equal to the preset threshold value, to minimize an error range that may occur when performing the time synchronization with the first, second, and third terminal apparatuses 10, 20, and 30.

A process of minimizing an error range occurring when performing a time synchronization between the terminal apparatus 100 and the terminal apparatus 200 will now be described in more detail.

Figure 4:
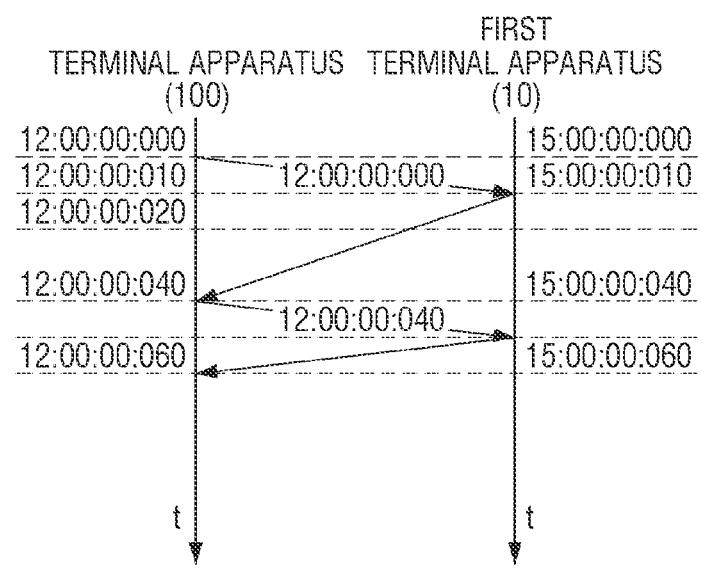
FIG. 4 is a view illustrating a process of performing a time synchronization with another terminal apparatus in a terminal apparatus according to an embodiment of the present disclosure.

FIG. 4 is a view illustrating a process of performing a time synchronization between a terminal apparatus and another terminal apparatus according to an embodiment of the present disclosure.

Referring to FIG. 4, the terminal apparatus 100 sets a time corresponding to a time at which a sync signal is to be transmitted to the first terminal apparatus 10 according to a broadcasting method, to a reference time. Thereafter, the terminal apparatus 100 transmits the sync signal including the set reference time to the first terminal apparatus 10. The terminal apparatus 100 stores the set reference time in the storage unit 130. For example, if the time at which the sync signal is to be transmitted is 12:00, then the terminal apparatus 100 sets 12:00 to the reference time and transmits the sync signal including the reference time to the first terminal apparatus 10. The terminal apparatus 100 stores the set reference time in the storage unit 130. Therefore, the storage unit 130 stores the reference time that is 12:00. If the first terminal apparatus 10 receives the sync signal from the terminal apparatus 100, then the first terminal apparatus 10 transmits a response signal to the received sync signal to the terminal apparatus 100. Therefore, the terminal apparatus 100 acquires a reception time of the response signal to the sync signal received from the first terminal apparatus 10. For example, the response signal may be received from the first terminal apparatus 10 at a time that is 40 seconds of/1000 minutes after transmitting the sync signal at 12:00. In this case, the reception time of the response signal received from the first terminal apparatus 10 may be 12:00:00:040. If the reception time is acquired, then the terminal apparatus 100 calculates a time difference with the first terminal apparatus 10 based on the reference time stored in relation to the sync signal and the reception time of the response signal received from the first terminal apparatus 10. As described above, if the reference time stored in relation to the sync signal is 12:00:00:000, and the reception time of the response signal is 12:00:00:040, then the terminal apparatus 100 may calculate a time difference that is 20 seconds of 1000 minutes through Equation (2) above.

The terminal apparatus 100 may re-transmit the sync signal to the first terminal apparatus 10 at a time when the response signal is received from the first terminal apparatus 10, according to a preset condition. Therefore, the terminal apparatus 100 may re-transmit the sync signal including the reference time to the first terminal apparatus 10 at the reception time (12:00:00:040) of the response signal received from the first terminal apparatus 10. The reference time included in the re-transmitted sync signal may be a time corresponding to a time at which the sync signal is to be transmitted. As in the above-described embodiment of the present disclosure, if the sync signal is transmitted to the first terminal apparatus 10 at the reception time (12:00:00:040) of the response signal, then the reference time "12:00:00: 040" may be set and included in the sync signal. In addition, the reference time "12:00:00:040" may be stored in the storage unit 130.

After the sync signal is re-transmitted at the time 12:00: 00:040, the response signal may be received from the first terminal apparatus 10 at a time that is 60 seconds of 1000 minutes. In this case, the reception time of the response signal received from the first terminal 10 may be 12:00:00: 060. If the reception time is acquired, then the terminal apparatus 100 calculates a time difference with the first terminal apparatus 10 based on a reference time stored in relation to the re-transmitted sync signal and the reception time of the response signal received from the first terminal apparatus 10 in relation to the re-transmitted sync signal. As in the above-described embodiment of the present disclosure, if the reference time stored in relation to the re-transmitted sync signal is 12:00:00:040, and the reception time of the response signal received from the first terminal apparatus 10 in relation to the re-transmitted sync signal is 12:00:00:060, then the terminal apparatus 100 may calculate a time difference of 10 seconds of 1000 minutes through Equation (2) above.

If a time difference is calculated based on a response signal to an initially transmitted sync signal and a response signal to a re-transmitted sync signal as described above, then the terminal apparatus 100 performs a time synchronization with the first terminal apparatus 10 based on a time difference having a lowest one of absolute values of calculated time differences. As in the above-described embodiment present disclosure, if a time difference calculated based on a response signal to an initially transmitted sync signal is 20 seconds of 1000 minutes, and a time difference calculated based on a response signal to a re-transmitted sync signal is 10/1000, then the terminal apparatus 100 determines that an absolute value of the time difference calculated based on the response signal to the re-transmitted sync signal is the lowest. Therefore, the terminal apparatus 100 may perform a time synchronization with the first terminal apparatus 10 based on the time difference calculated from the response signal to the re-transmitted sync signal.

An operation of the terminal apparatus 100, which performs a time synchronization with the first, second, and third terminal apparatuses 10, 20, and 30 based on a reception time of first received one of response signals received from the first, second, and third terminal apparatuses 10, 20, 30, has been described in detail. An operation of the terminal apparatus 100, which performs a time synchronization with another terminal apparatus having transmitted a sync signal, will now be described in detail.

According to various embodiments of the present disclosure, if the terminal apparatus 100 performs a time synchronization with another terminal apparatus that has transmitted a sync signal, then the terminal apparatus 100 may further include a calculator 150.

If a sync signal including a reference time is received from another terminal apparatus through the communicator 110, then the calculator 150 calculates a time difference from the reference time included in the received sync signal and a reception time of the sync signal received from the other terminal apparatus. The reception time of the sync signal may be a current time of the terminal apparatus 100. In detail, the calculator 150 may calculate the time difference through Equation (1) described above.

If the sync signal is received from the other terminal apparatus, then the controller 140 controls the communicator 110 to transmit a response signal to the received sync signal to the other terminal apparatus. The controller 140 performs a time synchronization with the other terminal apparatus based on the time difference calculated by the calculator 150.

According to various embodiments of the present disclosure, if the sync signal is continuously received from the other terminal apparatus for a preset threshold time, then the controller 140 may perform a time synchronization with the other terminal apparatus based on a time difference having a highest absolute value among time differences that are calculated to respectively correspond to the received sync signal.

According to various embodiments of the present disclosure, if a sync signal is received from the other terminal apparatus within a preset threshold time after a response signal to the sync signal received from the other terminal apparatus is transmitted to the other terminal apparatus, then the controller 140 may perform a time synchronization with the other terminal apparatus based on a time difference having a highest absolute value among a time difference calculated based on a previous sync signal and a time difference calculated based on a current sync signal.

An operation of the terminal apparatus 100, which calculates a time difference based on a reference time included in a sync signal received from another terminal apparatus and a reception time of the sync signal, will now be described with reference to FIG. 4.

The first terminal apparatus 10 shown in FIG. 4 may be the terminal apparatus 100 including the calculator 150, and the terminal apparatus 100 shown in FIG. 4 may be another terminal apparatus that transmits a sync signal. The terminal apparatus 100 including the calculator 150 will be described as the first terminal apparatus 100 shown in FIG. 4, and the other terminal apparatus transmitting the sync signal will be described as the terminal apparatus 100 shown in FIG. 4.

If a sync signal including a reference time "12:00:00:000" is received, then the first terminal apparatus 10 transmits a response signal to the received sync signal to the terminal apparatus 100. If the sync signal is received from the terminal apparatus 100, then the first terminal apparatus 10 acquires a reception time of the sync signal. As shown in FIG. 4, the reception time of the sync signal may be 15:00:00:010. If the reception time is acquired, then the first terminal apparatus 10 calculates a time difference with the terminal apparatus 100 based on a reference time included in the sync signal and the reception time of the sync signal. As described above, if the reference time included in the received sync signal is 12:00:00:000, and the reception time of the sync signal is 15:00:00:010, then the first terminal apparatus 10 may calculate a time difference that is 10 seconds of 3 hours 1000 minutes, through Equation (1) described above.

If a sync signal including a reference time "12:00:00:040" is received, then the first terminal apparatus 10 transmits a response signal to the received sync signal to the terminal apparatus 100. If the sync signal is received from the terminal apparatus 100, then the first terminal apparatus 10 acquires a reception time of the sync signal. If the reception time of the sync signal is 15:00:00:050, then the first terminal apparatus 10 calculates a time difference with the terminal apparatus 100 based on the reference time included in the sync signal and the reception time of the sync signal. If the reference time included in the received sync signal is 12:00:00:040, and the reception time of the sync signal is 15:00:00:0505 as described above, then the first terminal apparatus 10 may calculate a time difference that is 10 seconds of 3 hours 1000 minutes, through Equation (1) described above.

As described above, if time differences are respectively calculated from an initially transmitted sync signal and a re-transmitted sync signal, then the first terminal apparatus 10 performs a time synchronization with the terminal apparatus 100 based on the time difference having the highest absolute value among absolute values of the calculated time differences. In the above-described example, all of the time differences respectively calculated in relation to the initially transmitted sync signal and the re-transmitted sync signal may be 10 seconds of 3 hours 1000 minutes. In this case, the absolute values of the calculated time differences are the same, and thus the first terminal apparatus 10 may perform a time synchronization with the terminal apparatus 100 based on one of the calculated time differences.

However, if the initially transmitted sync signal is received before 15:00:00:010, then the absolute value of the time difference calculated in relation to the re-transmitted sync signal may be higher. In this case, the first terminal apparatus 10 may perform a time synchronization with the terminal apparatus 100 based on the time difference calculated in relation to the re-transmitted sync signal.

As described above, if a sync signal is re-transmitted within a preset threshold time after the sync signal is received from the terminal apparatus 100, then the first terminal apparatus 10 calculates time differences based on reference times included in the respective sync signals and reception times of the respective sync signal and performs a time synchronization with the terminal apparatus 100 that has transmitted the sync signal, based on the time difference having the highest absolute value among the calculated time differences. Therefore, the first terminal apparatus 10 may minimize an error range that may occur when performing the time synchronization with the terminal apparatus 100 that has transmitted the sync signal.

If a time synchronization is performed between the terminal apparatus 100 that has transmitted the sync signal and the first terminal apparatus 10 that has transmitted a response signal to the sync signal to the terminal apparatus 100, then the terminal apparatus 100 and the first terminal apparatus 10 may determine a common time between the terminal apparatus 100 and the first terminal apparatus 10 from a sum of current times of the terminal apparatus 100 and the first terminal apparatus 10 and the calculated time differences.

Figure 5:
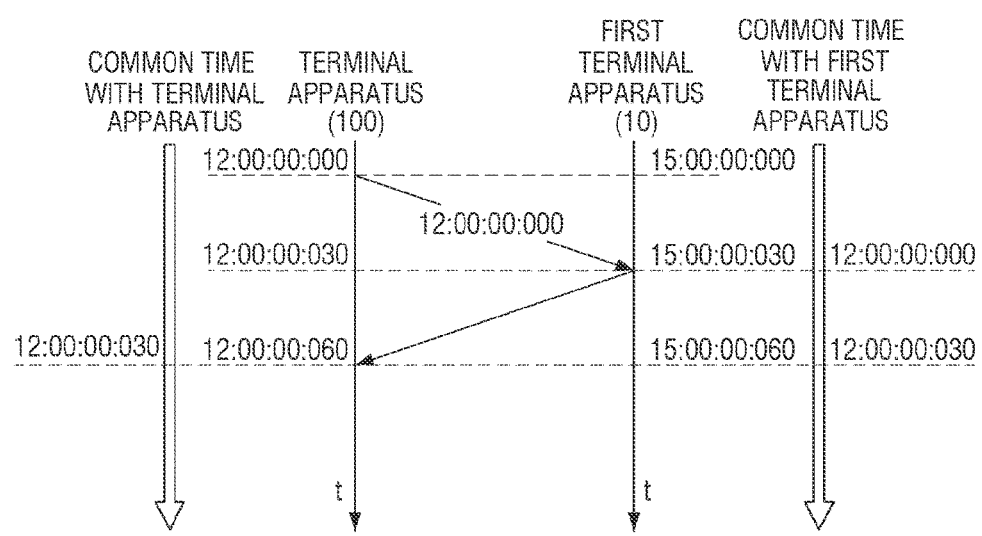
FIG. 5 is a view illustrating a process of performing a time synchronization according to a time synchronization request of another terminal apparatus in a terminal apparatus according to an embodiment of the present disclosure.

FIG. 5 is a view illustrating a process of setting a common time with another terminal apparatus, with which a time synchronization is performed, in a terminal apparatus, according to an embodiment of the present disclosure.

Referring to FIG. 5, the terminal apparatus 100 transmits a sync signal including a preset reference time to the first terminal apparatus 10. The terminal apparatus 100 stores the preset time reference. If a response signal to the sync signal is received from the first terminal apparatus 10, then the terminal apparatus 100 acquires a reception time of the response signal received from the first terminal apparatus 10. The terminal apparatus 100 calculates a time difference based on the stored reference time and the reception time of the response signal. If the stored reference time is 12:00:00:000, and the reception time of the response signal received from the first terminal apparatus 10 is 12:00:00:060, then the terminal apparatus 100 calculates a time difference that is 30 seconds of 1000 minutes based on Equation (2) described above and performs a time synchronization with the first terminal apparatus 10 based on the calculated time difference.

If the sync signal is received from the terminal apparatus 100, then the first terminal apparatus 10 calculates a time difference based on the reference time included in the received sync signal and a reception time of the sync signal. As shown in FIG. 5, if the reference time included in the sync signal is 12:00:00:000, and the reception time of the sync signal is 15:00:00:030, then the first terminal apparatus 10 may calculate a time difference that is 30 seconds of 3 hours 1000 minutes based on Equation (1) described above. Therefore, the first terminal apparatus 10 performs a time synchronization with the terminal apparatus based on the time difference that is 30 seconds of 3 hours 1000 minutes.

The terminal apparatus 100 calculates a common time with the first terminal apparatus 10 from a sum of a current time of the terminal apparatus 100 and a calculated time difference. For example, if the current time is 12:00:00:060, and the calculated time difference is 30 seconds of 1000 minutes, then the terminal apparatus 100 may calculate a common time of 12:00:00:030 from a sum of the current time "12:00:00:060" and 30 seconds of 1000 minutes that is the calculated time difference.

The first terminal apparatus 10 may calculate the common time with the terminal apparatus 100 from a sum of the current time of the terminal apparatus 100 and the calculated time difference. The current time of the first terminal apparatus 10 may be a current time of the first terminal apparatus 10 corresponding to a current time that has been used in the terminal apparatus 100 to calculate the common time. For example, if the current time used in the terminal apparatus 100 to calculate the common time is 12:00:00:060, then the current time of the first terminal apparatus 10 corresponding to the current time of the terminal apparatus 100 may be 15:00:00:060. In addition, as described above, the calculated time difference may be 30 seconds of 3 hours 1000 minutes. In this case, the first terminal apparatus 10 may calculate a common time of 12:00:00:030 from a sum of the current time "15:00:00:606" of the first terminal apparatus 10 and 30 seconds of 3 hours 1000 minutes that is the calculated time difference.

Therefore, in order to simultaneously perform an event in the terminal apparatus 100 and the first terminal apparatus 10 at a common time of 12:00:00:030, the terminal apparatus 100 may perform the event at a time of 12:00:00:060, and the first terminal apparatus 10 may perform the event at a time of 15:00:00:060.

For example, if an event such as a moving picture file or a music file is simultaneously performed in the terminal apparatus 100 and the first terminal apparatus 10, then the terminal apparatus 100 may play the moving picture file or the music file at a time of 12:00:00:060 corresponding to the common time of 12:00:00:060, and the first terminal apparatus 10 may play the moving picture file or the music file at a time of 15:00:00:060 corresponding to the common time of 12:00:00:030.

An operation of performing a time synchronization with another terminal apparatus in a terminal apparatus according to various embodiments of the present disclosure has been described in detail. A method of performing a time synchronization with another terminal apparatus in a terminal apparatus will now be described in detail.

Figure 6:
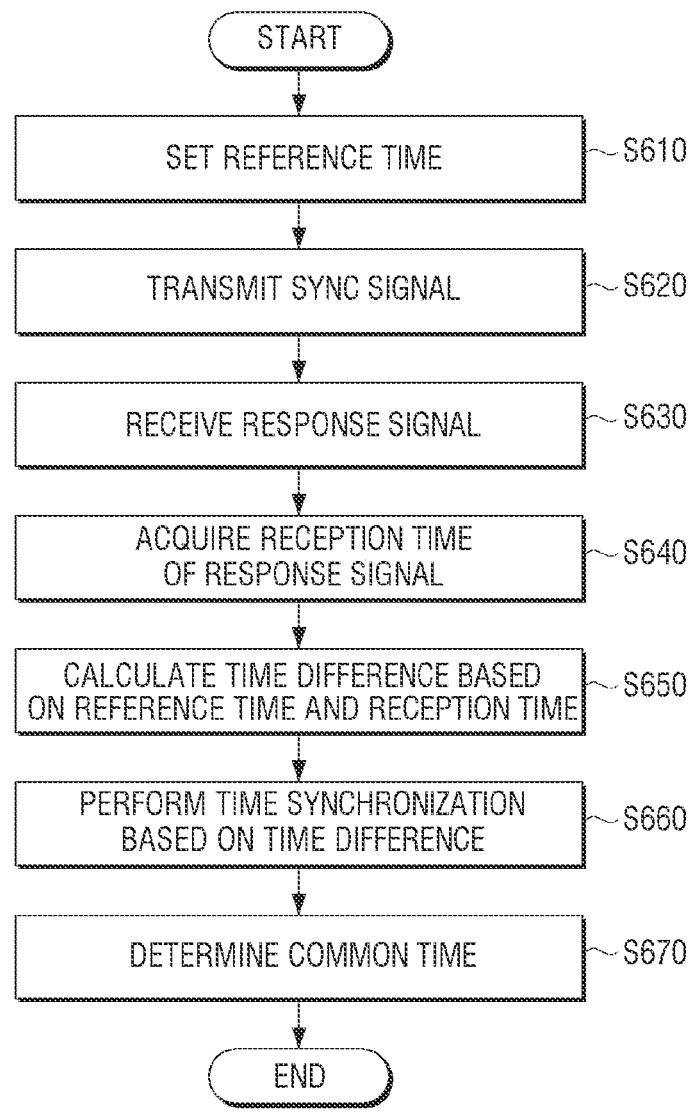
FIG. 6 is a flowchart illustrating a method of performing a time synchronization with another terminal apparatus in a terminal apparatus according to an embodiment of the present disclosure.

FIG. 6 is a flowchart illustrating a method of performing a time synchronization with another terminal apparatus in a terminal apparatus according to an embodiment of the present disclosure.

Referring to FIG. 6, at operation S610, the terminal apparatus 100 sets a reference time for performing a time synchronization with a plurality of other terminal apparatus. The reference time may be a time corresponding to a time at which a sync signal is to be transmitted to the plurality of other terminal apparatuses to perform the time synchronization. However, various embodiments of the present disclosure are not limited thereto, and the reference time may be an arbitrary time that is arbitrarily set by a user. According to various embodiments of the present disclosure, the reference time is set to a time corresponding to a time at which a sync signal is to be transmitted to another terminal apparatus.

If the reference time is set at operation S610, then at operation S620, the terminal apparatus 100 transmits a sync signal including the reference time to the plurality of other terminal apparatuses. The terminal apparatus 100 may store the reference time.

At operation S630, the terminal apparatus 100 receives response signals from the plurality of other terminal apparatuses in response to the sync signal.

If response signals to the sync signal are received from the plurality of other terminal apparatuses at operation S630, then at operation S640, the terminal apparatus 100 acquires a reception time of first received one of the response signals received from the plurality of other terminal apparatuses.

At operation S650, the terminal apparatus 100 calculates a time difference based on the reference time and the acquired reception time.

At operation S660, the terminal apparatus 100 performs a time synchronization with the plurality of other terminal apparatuses based on the calculated time difference. For example, if the reference time is set, then the terminal apparatus 100 transmits the sync signal by using a broadcasting method so that all of the other terminal apparatuses positioned within a wireless communication radius receive the sync signal. The terminal apparatus 100 and all the other terminal apparatuses positioned within the wireless communication radius transmit response signals to the sync signal received from the terminal apparatus 100 to the terminal apparatus 100.

As a result, the terminal apparatus 100 receives the response signals from the plurality of other terminal apparatuses positioned within the wireless communication radius. If the response signals are received from the plurality of other terminal apparatuses as described above, then the terminal apparatus 100 calculates a time difference based on a reception time of the first received one of the response signals. Therefore, the terminal apparatus 100 may perform the time synchronization with the all other terminal apparatuses based on the calculated time difference.

As described with reference to FIG. 3, the terminal apparatus 100 may transmit the sync signal including the reference time to the first, second, and third terminal apparatuses 10, 20, and 30 by using a broadcasting method. Therefore, if the sync signal is received from the terminal apparatus 100, then the first, second, and third terminal apparatuses 10, 20, and 30 transmits response signals to the sync signal to the terminal apparatus 100. As a result, the terminal apparatus 100 may receive the response signals to the sync signal from the first, second, and third terminal apparatuses 10, 20, and 30. As described above, reception times of the response signals that the terminal apparatus 100 respectively receives from the first, second, and third terminal apparatuses 10, 20, and 30 may different from one another according to distances between the terminal apparatus 100 and the first, second, and third terminal apparatuses 10, 20, and 30 or a surrounding environment. For example, the reception time of the response signal received from the first terminal apparatus 10 may be 12:00, and the reception times of the response signals received from the second and third terminal apparatuses 20 and 30 may be later than the reception time of the response signal received from the first terminal apparatus 10. In this case, the terminal apparatus 100 may perform a time synchronization with the first, second, and third terminal apparatuses 10, 20, and 30 based on the reception time of the response signal received from the first terminal apparatus 10. The terminal apparatus 100 calculates a time difference based on a stored reference time and the reception time of the response signal received from the first terminal apparatus 10 to perform the time synchronization with the first, second, and third terminal apparatuses 10, 20, and 30 based on the reception time of the response signals received from the first terminal apparatus 10 of the plurality of other terminal apparatuses. In other words, the terminal apparatus 100 may calculate the time difference based on Equation (2) described above. If the time difference is calculated, then the terminal apparatus 100 determines whether to perform the time synchronization with the first, second, and third terminal apparatuses 10, 20, and 30 based on the calculated time difference.

According to various embodiments of the present disclosure, the terminal apparatus 100 may transmit a sync signal to the first, second, and third terminal apparatuses 10, 20, and 30 by the preset number of times and receive response signals to the sync signal from the first, second, and third terminal apparatuses 10, 20, and 30. In this case, the terminal apparatus 100 may determine whether to perform a time synchronization with the first, second, and third terminal apparatuses 10, 20, and 30 based on a time difference having a lowest absolute value among time differences calculated based on reception times of the received response signals.

For example, the first terminal apparatus 100 may be a terminal apparatus that has first transmitted a response signal in relation to a first sync signal. The second terminal apparatus 20 may be a terminal apparatus that has first transmitted a response signal in relation to a second sync signal. The third terminal apparatus 30 may be a terminal apparatus that has first transmitted a response signal in relation to a third sync signal. In this case, the terminal apparatus 100 calculates a time difference based on a reception time of the response signal of the first terminal apparatus 10 that has first transmitted the response signal in relation to the first sync signal and a reference time stored in relation to the first sync signal.

The terminal apparatus 100 calculates a time difference based on a reception time of the response signal of the second terminal apparatus 20 that has first transmitted the response signal in relation to the second sync signal and a reference time stored in relation to the second sync signal. The terminal apparatus 100 calculates a time difference based on a reception time of the response signal of the third terminal apparatus 30 that has first transmitted the response signal in relation to the third sync signal and a reference time stored in relation to the third sync signal. If the time differences are calculated to respectively correspond to the first, second, and third sync signals as described above, then the terminal apparatus 100 acquires the time difference having a lowest absolute value among the calculated time differences. For example, if the absolute value of the time difference calculated is determined to correspond to the first sync signal is the lowest, then the terminal apparatus 100 may perform a time synchronization with the first, second, and third terminal apparatuses 10, 20, and 30 based on the time difference calculated to correspond to the first sync signal.

As described above, the terminal apparatus 100 transmits a sync signal to the first, second, and third terminal apparatuses 10, 20, and 30 by the preset number of times and calculates a time difference based on first received one of response signals to the sync signal. The terminal apparatus 100 may perform a time synchronization based on a time difference having a lowest absolute value among calculated time differences to minimize an error range that may occur when performing the time synchronization with the first, second, and third terminal apparatuses 10, 20, and 30.

According to various embodiments of the present disclosure, if an absolute value of a time difference, which is calculated based on a reception time of first received one of response signals received from the first, second, and third terminal apparatuses 10, 20, and 30, is lower than or equal to a preset threshold value, then the terminal apparatus 100 may perform a time synchronization with the first, second, and third terminal apparatuses 10, 20, and 30 based on the calculated time difference. If the absolute value of the calculated time difference exceeds the preset threshold value, then the terminal apparatus 100 may re-transmit the sync signal to the first, second, and third terminal apparatuses 10, 20, and 30. If response signals to the re-transmitted sync signal are received from the first, second, and third terminal apparatuses 10, 20, and 30, then the terminal apparatus 100 may re-calculate a time difference based on a reception time of first received one of the received response signals. The terminal apparatus 100 may determine whether an absolute value of the re-calculated time difference is lower than or equal to a preset threshold value. If the absolute value of the re-calculated time difference exceeds the preset threshold value, then the terminal apparatus 100 re-transmits the sync signal to the first, second, and third terminal apparatuses 10, 20, and 30 until a time difference lower than the preset threshold is acquired.

As described above, the terminal apparatus 100 may determine whether to re-transmit the sync signal to the first terminal apparatus 10, according to whether the absolute value of the calculated time difference is lower than or equal to the preset threshold value, in order to minimize an error range that may occur when performing a time synchronization with the first terminal apparatus 10.

If the time difference for the time synchronization with the plurality of other terminal apparatuses is calculated as described above, then at operation S670, the terminal apparatus 100 determines a common time with the plurality of other terminal apparatuses from a sum of the stored reference time and the calculated time difference. As described with reference to FIG. 5, the terminal apparatus 100 may transmit a sync signal including a reference time of 12:00:00:000 to the first terminal apparatus 10. The terminal apparatus 100 may receive a response signal to the sync signal from the first terminal apparatus 10. If the response signal is received, then the terminal apparatus 100 calculates a time difference based on a preset reference time and a reception time of the response signal received from the first terminal apparatus 10. If the preset reference time is 12:00:00:000, and the reception time of the response signal is 12:00:00:060 as shown in FIG. 5, then the terminal apparatus may calculate a time difference that is 30 seconds of 1000 minutes based on Equation (2) described above. If the time difference is calculated, then the terminal apparatus 100 may determine a common time with the first terminal apparatus 10 from a sum of a current time and the calculated time difference. As shown in FIG. 5, the current time of the terminal apparatus 100 may be 12:00:00:060, and the calculated time difference may be 30 seconds of 1000 minutes. Therefore, the common time determined from the sum of the current time and the calculated time difference may be 12:00:00:030. In other words, the terminal apparatus 100 may perform an event at a time of 12:00:060 to simultaneously perform the event with the first terminal apparatus 10 at the common time of 12:00:00:030.

For example, if the terminal apparatus 100 simultaneously performs an event, such as a moving picture file or a music file, with the first terminal apparatus 10 at a preset common time, then the terminal apparatus 100 may play the moving picture file or the music file at a time of 12:00:00:060 corresponding to the common time of 12:00:00:030.

Figure 7:
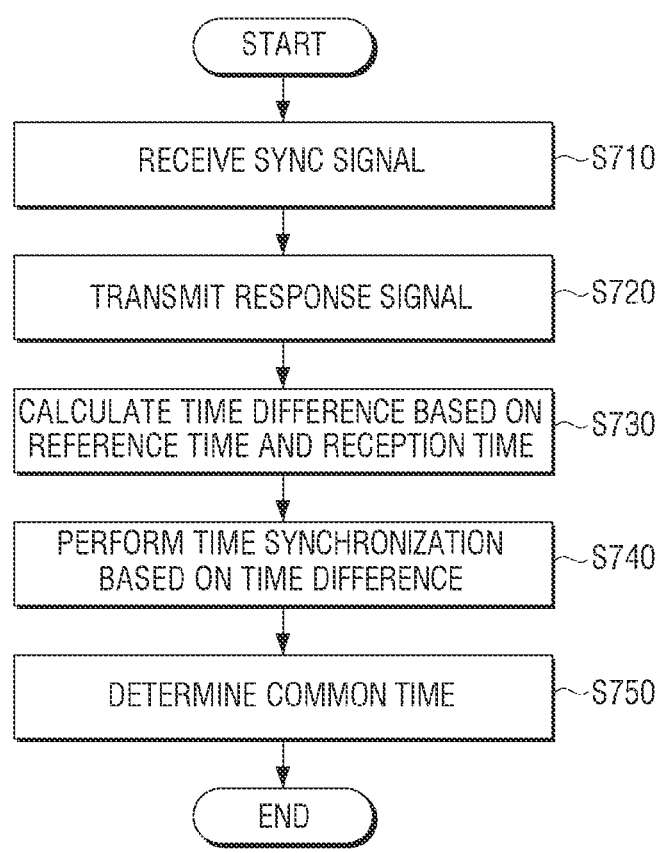
FIG. 7 is a flowchart illustrating a method of performing a time synchronization, which requests a time synchronization, in a terminal apparatus, according to an embodiment of the present disclosure.

FIG. 7 is a flowchart illustrating a method of performing a time synchronization with another terminal apparatus that has requested a time synchronization, in a terminal apparatus, according to an embodiment of the present disclosure.

Referring to FIG. 7, at operation S710, the terminal apparatus 100 receives a sync signal including a reference time from the terminal apparatus 200.

At operation S720, the terminal apparatus 100 transmits a response signal to the sync signal to the terminal apparatus 200 that has transmitted the sync signal.

At operation S730, the terminal apparatus 100 calculates a time difference based on the reference time included in the sync signal received from the terminal apparatus 200 and a reception time of the sync signal.

At operation S740, the terminal apparatus 100 performs a time synchronization with the terminal apparatus 200 based on the calculated time difference. Various embodiments of the present disclosure are not limited thereto, and if a sync signal is received, then the terminal apparatus 100 may calculate a time difference based on a reference time included in the received sync signal and a reception time of the sync signal and transmit a response signal to the sync signal to the terminal apparatus 200.

The reception time of the sync signal received from the terminal apparatus 200 may be a current time of the terminal apparatus 100. Therefore, if the sync signal is received from the terminal apparatus 200, then the terminal apparatus 100 may calculate a time difference based on the reference time included in the received sync signal and the reception time of the sync signal (e.g., the current time of the terminal apparatus 100). In detail, the terminal apparatus 100 may calculate the time difference through Equation (1) described above. For example, the reference time included in the sync signal may be 12:00, and the reception time of the sync signal may be 13:30. In this case, the terminal apparatus 100 calculates a difference between the reference time "12:00" included in the sync signal and the reception time "13:30" of the sync signal based on Equation (1) described above. Therefore, the terminal apparatus 100 may calculate a time difference of 1 hour 30 minutes.

According to various embodiments of the present disclosure, if a sync signal is continuously received from the terminal apparatus 200 for a preset threshold time, then the terminal apparatus 100 may perform a time synchronization with the terminal apparatus 200 based on a time difference having a highest absolute value among time differences calculated to respectively correspond to the received sync signal.

According to various embodiments of the present disclosure, if the sync signal is re-received from the terminal apparatus 200 within a preset threshold time after a response signal to the sync signal received from the terminal apparatus 200, then the terminal apparatus 100 may perform a time synchronization with the terminal apparatus 200 based on a time difference having a highest absolute value among time differences calculated based a time difference calculated from a previous sync signal and a time difference calculated from a currently re-received sync signal.

As described with reference to FIG. 5, if a reception time of a sync signal received from the terminal apparatus 200 is 12:30, and a reference time included in the sync signal is 13:00, then the terminal apparatus 100 calculates a difference between the reference time of 13:00 and the reception time of the sync signal of 12:30. Therefore, the terminal apparatus 100 may calculate a time difference of 30 seconds. The terminal apparatus 100 transmits a response signal to the terminal apparatus 200 and then determines whether the sync signal has been re-received from the terminal apparatus 200 within a preset threshold time. If it the sync signal is determined to have been re-received from the terminal apparatus 200 within the preset threshold time, then the terminal apparatus 100 calculates a time difference based on a reception time of the re-received sync signal and a reference time of the re-received sync signal.

For example, if the reception time of the sync signal re-received from the terminal apparatus 200 is 13:10, and the reference time included in the re-received sync signal is 14:00, then the terminal apparatus 100 calculates a difference between the reference time of 14:00 and the reception time of the re-received sync signal of 13:00. Therefore, the terminal apparatus 100 may calculate a time difference of 50 seconds.

If time differences are calculated based on an initially received sync signal and a re-received sync signal as described above, then the terminal apparatus 100 compares absolute values of the calculated time differences and performs a time synchronization with the terminal apparatus 200 based on the time difference having the highest absolute value. As in the above-described example, if an absolute value of a time difference calculated based on an initially received sync signal is 30, and an absolute value of a time difference calculated based on a re-received sync signal is 50, then the terminal apparatus 100 determines that the absolute value of the time difference calculated based on the re-received sync signal is the highest. Therefore, the terminal apparatus 100 may perform a time synchronization with the terminal apparatus 200 based on the time difference calculated based on the re-received sync signal.

As described above, according to various embodiments of the present disclosure, the terminal apparatus 100 calculates a time difference based on a sync signal received from the terminal apparatus 200 for a preset threshold time and performs a time synchronization with the terminal apparatus 200 based on a time difference having a highest absolute value among calculated time differences. Therefore, the terminal apparatus 100 may minimize an error range that may occur when performing the time synchronization with the terminal apparatus 200.

If the time synchronization is performed with the terminal apparatus 200, then at operation S750, the terminal apparatus 100 determines a common time with the terminal apparatus 200 from a sum of time differences calculated based on the reception time of the sync signal received from the terminal apparatus 200 and the reference time included in the sync signal. As in the above-described example, the reception time of the sync signal received from the terminal apparatus 200 may be 13:10, and a time difference calculated based on the reference time included in the sync signal may be 50 minutes. In this case, the terminal apparatus 100 may determine 14:00 induced from a sum of the reception time of 13:10 of the sync signal and the time difference of 50 minutes as a common time with the terminal apparatus 200. In other words, a method of performing a time synchronization with a plurality of other terminal apparatuses based on first received one of response signals received from the plurality of other terminal apparatuses in the terminal apparatus 100 has been described in detail. A method of performing a time synchronization with another terminal apparatus in the terminal apparatus 100 according to a request of the other terminal apparatus for the time synchronization will now be described.

As another example, reception time of the sync signal received from the other terminal apparatus may be a current time of the terminal apparatus 100. Therefore, if the sync signal is received from the other terminal apparatus, then the terminal apparatus 100 may calculate a time difference based on the reference time included in the received sync signal and the reception time of the sync signal (e.g., the current time of the terminal apparatus 100). In detail, the terminal apparatus 100 may calculate the time difference through Equation (1) described above. For example, the reference time included in the sync signal may be 12:00:00:000, and the reception time of the sync signal may be 15:00:00:030. In this case, the terminal apparatus 100 calculates a difference between the reference time of 12:00:00:000 included in the sync signal and the reception time of 15:00:00:0303 of the sync signal based on Equation (1) described above. Therefore, the terminal apparatus 100 may calculate a time difference that is 30 seconds of 3 hours 1000 minutes.

According to various embodiment of the present disclosure, if a sync signal is continuously received from the other terminal apparatus for a preset threshold time, then the terminal apparatus 100 may perform a time synchronization with the other terminal apparatus based on a time difference having a highest absolute value among time differences calculated to respectively correspond to the received sync signal.

According to various embodiments of the present disclosure, if a sync signal is re-received from the another embodiment within a preset threshold time after a response signal to the sync signal received from the other terminal apparatus is transmitted, then the terminal apparatus 100 may perform a time synchronization with the other terminal apparatus based on a time difference having a highest absolute value among time differences that are calculated based on a time difference calculated based on a previous sync signal and a time difference calculated based on a currently re-received sync signal.

For example, if a reception time of the sync signal received from the other terminal apparatus is 15:00:00:005, and a reference time included in the sync signal is 12:00:00:000, then the terminal apparatus 100 may calculate a time difference that is 5 seconds of 3 hours 1000 minutes through a time between the reference time included in the sync signal and the reception time of the sync signal. The terminal apparatus 100 may transmit a response signal to the sync signal and then re-receive the sync signal from the other terminal apparatus. If the sync signal is re-transmitted, then the terminal apparatus 100 calculates a time difference based on a reference time included in the re-transmitted sync signal and a reception time of the re-transmitted sync signal.

For example, if the reference time of the sync signal re-transmitted from the other terminal apparatus is 12:00:00:040, and the reception time of the sync signal is 15:00:00:050, then the terminal apparatus 100 may calculate a time difference that is 10 seconds of 3 hours 1000 minutes based on Equation (1) described above. If a time difference is calculated in relation to an initially transmitted sync signal and a re-transmitted sync signal as described above, then the terminal apparatus 100 performs a time synchronization with the other terminal apparatus based on a time difference having a highest absolute value among calculated time differences. As in the above-described example, if the absolute value of the time difference calculated based on the initially transmitted sync signal is 5 seconds of 3 hours 1000 minutes, and the absolute value of the time difference calculated based on the re-transmitted sync signal is 10 seconds of 3 hours 1000 minutes, then the terminal apparatus 100 determines that the absolute value of the time difference calculated based on the re-transmitted sync signal is the highest. Therefore, the terminal apparatus 100 may perform a time synchronization with the other terminal apparatus based on the time difference calculated based on the re-transmitted sync signal.

As described above, the terminal apparatus 100 according to the present disclosure calculates a time difference based on a sync signal received from the other terminal apparatus for a preset threshold time and performs a time synchronization with the other terminal apparatus based on a time difference having a highest absolute value among calculated time differences. Therefore, the terminal apparatus 100 may minimize an error range that may occur when performing the time synchronization with the another terminal apparatus.

If the time synchronization is performed with the other terminal apparatus, then at operation S750, the terminal apparatus 100 determines a common time with the other terminal apparatus from a sum of time differences calculated based on a current time and the reference time included in the sync signal. For example, if the current time of the terminal apparatus 100 is 15:00:00:030, and the time difference calculated from the reference time included in the sync signal is 30 seconds of 3 hours 1000 minutes, then the common time may be 12:00:00:000. Therefore, the terminal apparatus 100 may perform an event at a time of 15:00:00:030 to simultaneously perform the event with the other terminal apparatus at a common time of 12:00:00:000.

For example, if the terminal apparatus 100 performs an event, such as a moving picture file or a music file, simultaneously with the other terminal apparatus at a preset common time, then the terminal apparatus 100 may play the moving picture file or the music file at a time of 15:00:00:030 corresponding to the common time of 12:00:00:000.

According to various embodiments of the present disclosure as described above, a terminal apparatus may further simply and rapidly perform a time synchronization with another terminal apparatus.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing a time synchronization, the method comprising:
    setting a time, which corresponds to a time at which a sync signal for the time synchronization is to be transmitted to another terminal apparatus, as a reference time;
    transmitting the sync signal comprising the set reference time to at least two other terminal apparatuses; and
    when response signals to the transmitted sync signal are received from the at least two other terminal apparatuses, performing the time synchronization with each of the at least two other terminal apparatuses based on a time difference between the set reference time and a reception time of a first received response signal of the received response signals,
    wherein the performing of the time synchronization further comprises:
        comparing reception times of the response signals received from a first other terminal apparatus and a second other terminal apparatus to acquire the first received response signal,
        calculating the time difference between the set reference time and a reception time of the acquired response signal, and
        performing the time synchronization with the first other terminal apparatus and the second other terminal apparatus based on the calculated time difference,
    wherein the time difference is calculated using an equation corresponding to (S−V)/2, and
    wherein S denotes the set reference time comprised in the sync signal, and V denotes a reception time of the response signal.

2. The method of claim 1,
    wherein the sync signal is transmitted a preset number of times, and
    wherein the time synchronization is performed with the first other terminal apparatus and the second other terminal apparatus based on a time difference having a lowest absolute value among time differences that are calculated based on the reception times of the response signals received to respectively correspond to the sync signal transmitted the preset number of times.

3. The method of claim 1, wherein the time synchronization is performed with the first other terminal apparatus and the second other terminal apparatus according to whether an absolute value of the calculated time difference is lower than or equal to a preset threshold time.

4. The method of claim 1, further comprising:
    determining a common time with the first other terminal apparatus and the second other terminal apparatus from a sum of a current time of a terminal apparatus and the calculated time difference.

5. The method of claim 1, wherein the sync signal is transmitted by using a broadcasting method.

6. A method of performing a time synchronization with another terminal apparatus in a terminal apparatus, the method comprising:
    receiving a sync signal comprising a reference time from the other terminal apparatus;
    transmitting a response signal to the received sync signal to the other terminal apparatus; and
    performing the time synchronization with the other terminal apparatus based on a time difference that is calculated by the other terminal apparatus based on the reference time and a reception time that the other terminal apparatus receives a different response signal to the sync signal from a different apparatus,
    wherein the performing of the time synchronization further comprises:
        comparing, by the other terminal apparatus, reception times of the response signals received from the terminal apparatus and the different apparatus to acquire a first received response signal,
        calculating, by the other terminal apparatus, the time difference between the reference time and a reception time of the acquired response signal, and
        performing the time synchronization with the other terminal apparatus based on the calculated time difference,
    wherein the time difference is calculated by the other terminal apparatus using an equation corresponding to (S−V)/2, and
    wherein S denotes the reference time comprised in the sync signal, and V denotes a reception time of the response signal.

7. The method of claim 6, wherein, when the sync signal is continuously received from the other terminal apparatus for a preset threshold time, the time synchronization is performed with the other terminal apparatus based on a calculated time difference having a highest absolute value among time differences that are calculated to respectively correspond to the sync signal.

8. The method of claim 6, further comprising:
    determining a common time with the other terminal apparatus from a sum of a current time of the terminal apparatus and the calculated time difference.

9. A terminal apparatus comprising:
    a memory configured to store instructions therein;
    a transceiver configured to communicate with another terminal apparatus; and
    at least one processor configured, upon execution of the instructions, to:
        set a time, which corresponds to a time at which a sync signal for a time synchronization is to be transmitted to the other terminal apparatus, as a reference time,
        transmit the sync signal comprising the set reference time to at least two other terminal apparatuses using the transceiver, and
        when response signals to the transmitted sync signal are received from the at least two other terminal apparatuses, perform the time synchronization with each of the at least two other terminal apparatuses based on a time difference between the set reference time and a reception time of a first received response signal of the received response signals, wherein the at least one processor is further configured to:
 compare reception times of the response signals respectively received from a first other terminal apparatus and a second other terminal apparatus to calculate the time difference between the reception time of the first received response signal and the set reference time, and
 perform the synchronization with the first other terminal apparatus and the second other terminal apparatus based on the calculated time difference, wherein the at least one processor is further configured to calculate the time difference using an equation corresponding to (S−V)/2, and wherein S denotes the set reference time comprised in the sync signal, and V denotes the reception time of the response signal.

10. The terminal apparatus of claim 9, wherein the at least one processor is further configured to:
 control the transceiver to transmit the sync signal a preset number of times according to a control command of the at least one processor, and
 perform the time synchronization with the first other terminal apparatus and the second other terminal apparatus based on a time difference having a lowest absolute value among time differences that are calculated based on the reception times of the response signals received to respectively correspond to the sync signal transmitted the preset number of times.

11. The terminal apparatus of claim 9, wherein the at least one processor is further configured to:
 when an absolute value of the calculated time difference is lower than or equal to a preset threshold value, perform the time synchronization with the first other terminal apparatus and the second other terminal apparatus, and
 when the absolute value of the calculated time difference exceeds the preset threshold value, control the transceiver to re-transmit the sync signal to the first other terminal apparatus and the second other terminal apparatus.

12. The terminal apparatus of claim 9, wherein the at least one processor is further configured to determine a common time with the first other terminal apparatus and second other terminal apparatus from a sum of a current time of the terminal apparatus and the calculated time difference.

13. The terminal apparatus of claim 9, wherein the transceiver is further configured to perform the sync signal by using a broadcasting method.

14. A terminal apparatus configured to perform a time synchronization with another terminal apparatus that has requested the time synchronization, the terminal apparatus comprising:
 a memory configured to store instructions therein;
 a transceiver configured to communicate with the other terminal apparatus; and
 at least one processor configured, upon execution of the instructions, to:
  receive a sync signal comprising a reference time from the other terminal apparatus,
  transmit a response signal to the received sync signal to the other terminal apparatus, and
  perform the time synchronization with the other terminal apparatus based on a time difference that is calculated by the other terminal apparatus based on the reference time and a reception time that the other terminal apparatus receives a different response signal to the sync signal from a different apparatus, wherein the at least one processor is further configured to perform the time synchronization with the other terminal apparatus based on a time difference between the reference time and a reception time of an acquired response signal that is acquired by the other terminal apparatus, by the other terminal apparatus comparing reception times of the response signals received from the terminal apparatus and the different apparatus, wherein the time difference is calculated by the other terminal apparatus using an equation corresponding to (S−V)/2, and wherein S denotes the reference time comprised in the sync signal, and V denotes a reception time of the response signal.

15. The terminal apparatus of claim 14, wherein the at least one processor is further configured to, when the sync signal is continuously received from the other terminal apparatus for a preset threshold time, perform the time synchronization with the other terminal apparatus based on a time difference having a highest absolute value among time differences that are calculated to respectively correspond to the received sync signal.

16. The terminal apparatus of claim 14, wherein the at least one processor is further configured to determine a common time with the other terminal apparatus from a sum of a current time of the terminal apparatus and the calculated time difference.

* * * * *